May 20, 1952  J. J. PEROT, JR., ET AL  2,597,812
TENSILE TESTING DEVICE
Filed Dec. 12, 1947  2 SHEETS—SHEET 2
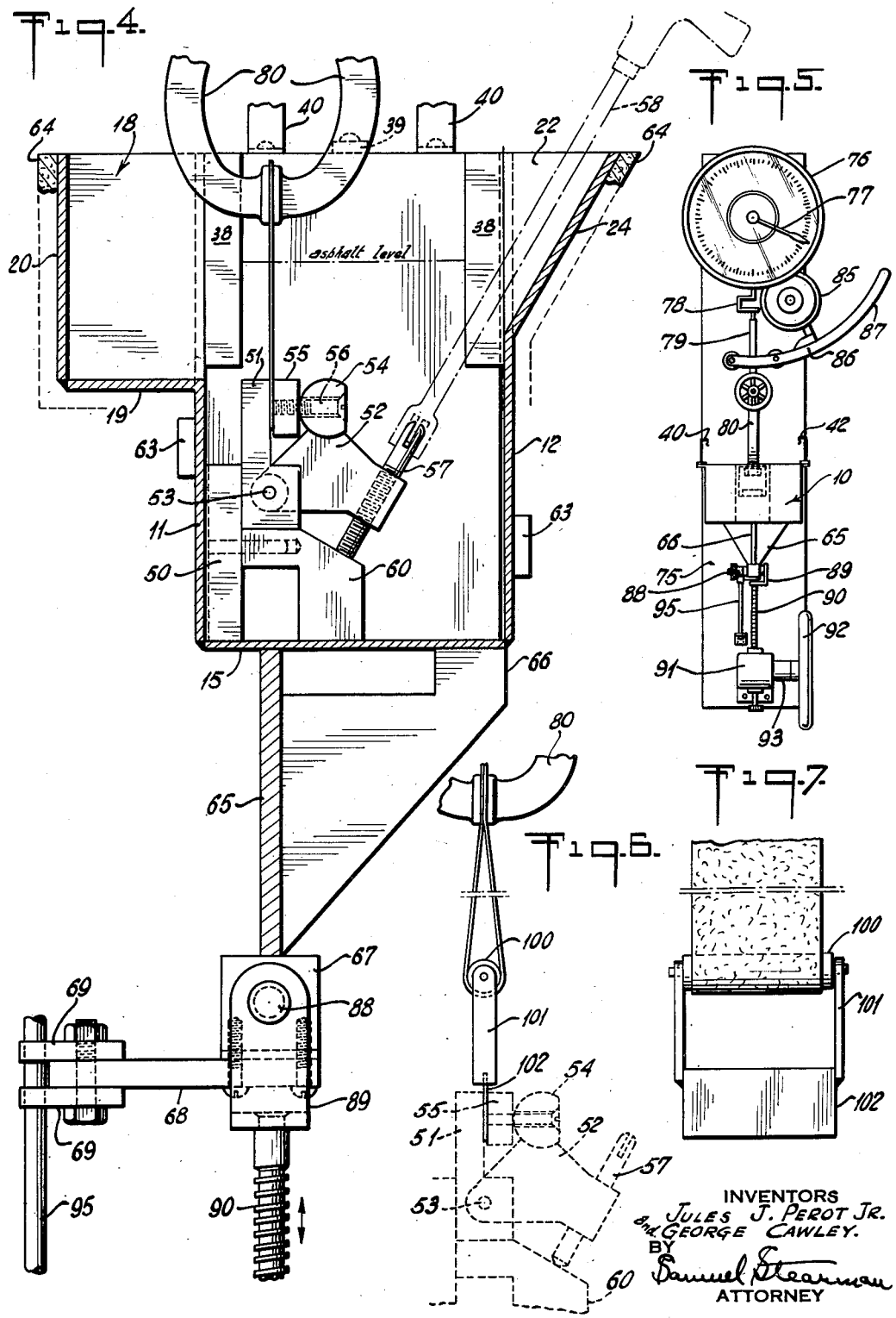
INVENTORS
JULES J. PEROT JR.
and GEORGE CAWLEY.
BY
Samuel Stearman
ATTORNEY Patented May 20, 1952

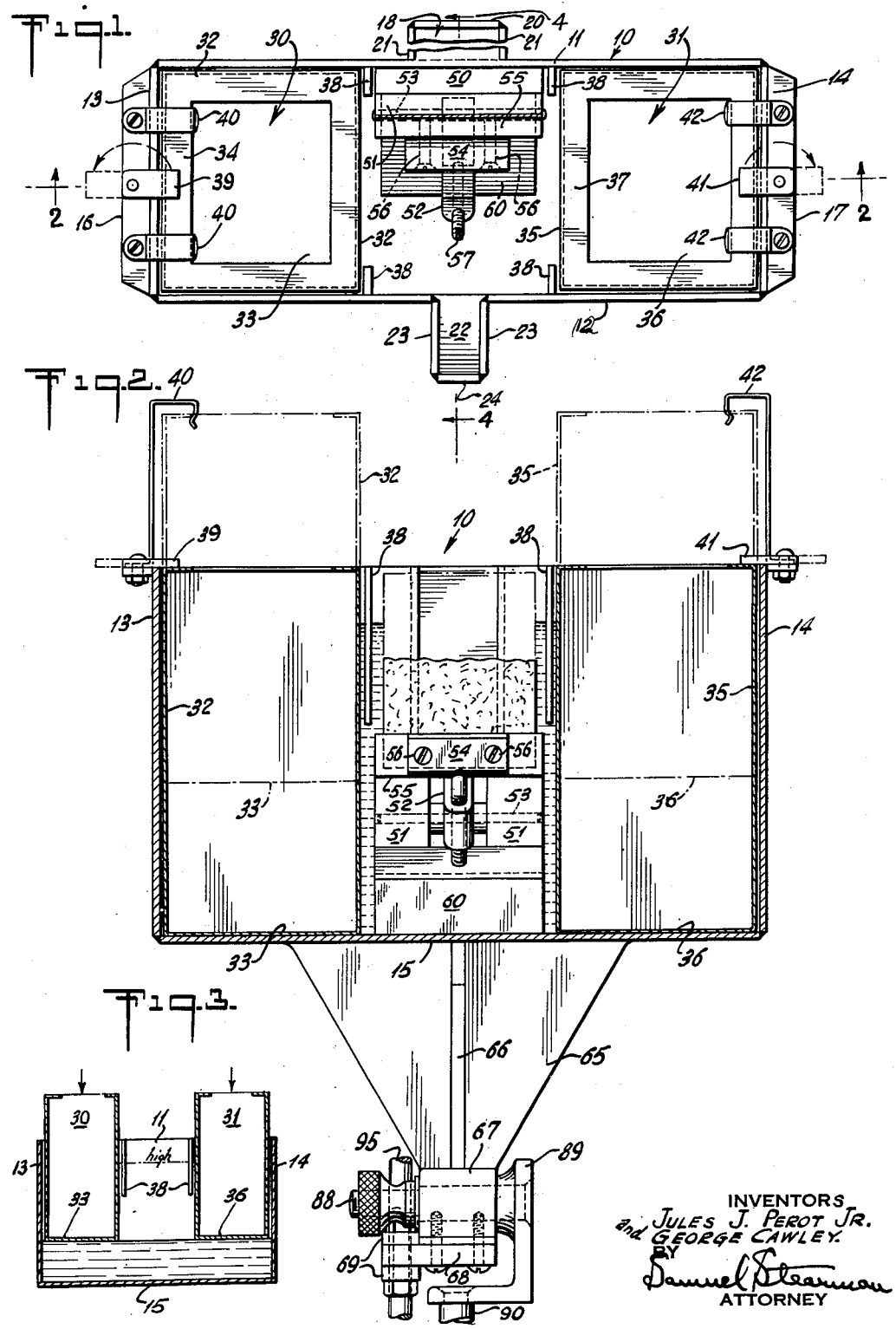

2,597,812

UNITED STATES PATENT OFFICE 2,597,812

TENSILE TESTING DEVICE

Jules J. Perot, Jr., Mountain Lakes, and George Cawley, Upper Montclair, N. J., assignors to The Patent and Licensing Corporation, New York, N. Y., a corporation of Massachusetts Application December 12, 1947, Serial No. 791,244

1 Claim. (Cl. 73—15.6)

This invention relates to a device for measuring the tensile strength of fibrous sheet materials, more particularly the tensile strength of such materials while immersed in liquid saturants therefor. Although not necessarily confined thereto, the invention is particularly concerned with a device for measuring the tensile strength of roofing felt while the felt is immersed in hot asphalt saturant.

In the manufacture of asphalt building materials such as shingles, roll roofing and the like, an important step involves the saturation of roofing felt with molten asphalt maintained at a temperature of about 450° F. The saturation step as it is commonly carried out in the industry involves passing a continuous sheet of felt through a bath of molten saturant, the sheet being guided through the bath by passing over upper and lower sets of guide rolls, the lower set being submerged in the saturant. The sheet of felt as it is run through the saturator is under a more or less continual strain. If the felt has insufficient tensile strength under the conditions of operation to withstand this strain, tearing of the felt results and the machine must be shut down with consequent loss of production time and man power while the sheet is being spliced. It is consequently of great importance to be able to determine in advance whether a given type of roofing felt will be satisfactory for use in the saturating machine. This involves a measurement of the tensile strength of the felt. It has been found, however, that performance of the felt in the saturating machine cannot be satisfactorily predicted from the tensile strength of the felt as commonly measured by the known tensile testing devices. A felt which may have a high tensile strength when so tested may exhibit comparatively low tensile strength during the period it is immersed in hot asphalt saturant. Nor is the tensile strength of saturated felt satisfactorily informative. The known tensile testing devices are not adapted for determining tensile strength of felt while the felt is immersed in hot asphalt.

It is an object of this invention to provide a device which may be used in measuring the tensile strength of fibrous sheet material, such as roofing felt, while immersed in liquid saturant such as molten asphalt.

It is a more particular object of this invention to provide a device which may be readily used in combination with a standard tensile strength testing instrument to provide an apparatus for determining the tensile strength of a sample of roofing felt while immersed in hot asphalt saturant.

According to the invention, there is provided a device adapted to replace the lower jaw of a standard tensile strength testing instrument such as, for example, the "Scott" tester, one form of which is described in U. S. Patent 1,324,470, dated December 9, 1919. The device of the present invention comprises a vessel for holding a quantity of hot liquid asphalt and containing a clamping means for securing one end of the sample of felt and a displacement means for maintaining the hot liquid asphalt at a desired level in the vessel.

Other features and advantages will be apparent from the more detailed description, which follows.

In the accompanying drawings:

Fig. 1 is a top plan view of the device;

Fig. 2 is a view in section taken along line 2—2 of Fig. 1;

Fig. 3 is a diagrammatic view showing the arrangement and operation of the asphalt displacement means;

Fig. 4 is a view in section taken along line 4—4 of Fig. 1;

Fig. 5 is a view in elevation showing the device of the invention attached to one form of a "Scott" tensile strength testing instrument;

Fig. 6 is a view in elevation of a mandrel holder adapted to be held by the clamp in the testing device; and Fig. 7 is a side view of the mandrel holder showing the manner in which the mandrel and the felt sample are secured.

Referring to the drawings, the numeral 10 designates generally a tank for holding a measured quantity of asphalt. The tank comprises side walls 11 and 12, end walls 13 and 14, and a bottom 15. The upper end of end wall 13 is provided with an outwardly extending flange 16 and a similar flange 17 is provided at the upper end of end wall 14. A portion of the upper half of wall 11 is cut away to provide for a clamp receptacle 18 comprised of bottom 19, end wall 20 and side walls 21. Opposite clamp receptacle 18, a portion of the upper half of side wall 12 is similarly cut away to provide a passageway 22 comprised of side walls 23 and forward wall 24 merging with wall 12.

The level of the asphalt which is maintained in tank 10 is adjusted by means of vertically movable displacement chambers 30 and 31. Displacement chamber 30 is formed by side walls 32 and bottom 33. The upper ends of the side walls are provided with an inwardly extending flange or rim 34. Displacement chamber 31 is similarly formed by side walls 35 and bottom 36. An inwardly extending flange or rim 37 is provided at the upper ends of walls 35. Guide bars 38 extend inwardly from walls 11 and 12 and serve to prevent lateral movement of displacement chambers 30 and 31. As shown in Fig. 2, displacement chamber 30 when depressed in tank 10 is held by catch 39 pivotally secured to flange 16. When in elevated position displacement chamber 30 is held by upwardly extending angular bars 40 which frictionally engage flange 34, the bar being secured to flange 16. Displacement chamber 31 is similarly held in a depressed or elevated position by pivoted catch 41 and angular bars 42, respectively, secured to flange 17.

The sample of felt being tested is held in place by a clamp which in the particular arrangement shown comprises a block 50 welded to wall 11 and bottom 15 centrally of wall 11, a fixed jaw 51 secured to block 50 and a movable jaw 52 extending into a recess in the lower part of jaw 51 and held by pivot 53. Movable jaw 52 has a head 54 to which a clamping bar 55 is loosely held by wobble screws 56. The wobble screws permit clamping bar 55 to adjust itself with respect to fixed jaw 51 in order that the sample of felt will be uniformly held between jaw 51 and bar 55. The position of movable jaw 52 is adjusted by a screw 57 which may be turned by a removable key 58. The end of screw 57 rests on a stop block 60 which is secured as by a screw to block 50 and rests on bottom 15.

In order that the material in the tank may be maintained at a selected temperature, there are provided strip heaters 63 secured to the bottom and walls of tank 10. To prevent unnecessary dissipation of heat and to aid in keeping the asphalt at a constant temperature, insulation 64 may be provided on all outer surfaces of tank 10, clamp receptacle 18 and passageway 22.

A supporting structure for tank 10 is provided to permit it to be securely held in combination with a tensile testing instrument such as that hereinafter described. The supporting structure in the embodiment illustrated comprises plates 65 and 66 welded to the underside of bottom 15. The end of plate 66 is welded to plate 65 perpendicularly thereto. The lower edge of plate 65 is secured as by welding to an apertured block 67. A brace is provided by bar 68 secured by screws to the underside of block 67. Apertured brace elements 69 are bolted to the end of bar 68.

Fig. 5 shows the device above described, in association with one type of tensile strength testing instrument whereby there is provided an apparatus for measuring the tensile strength of a sample of roofing felt while immersed in hot asphalt. A supporting board on which the instrument is mounted is designated by the numeral 75. The instrument shown comprises a dial 76 upon which the tensile strength is indicated by hand 77, in response to the tension exerted on lever arm 78 connected by shaft 79 to clamp 80. Counterweight 85, which is actuated by lever arm 78 is provided with ratchet 86 which engages grooves in curved arm 87. Tank 10 is held in position by bracket bolt 88 which firmly supports block 67 in a bracket 89. Bracket 89 is attached to the upper end of a threaded rod 90 which is the tension exerting member of the tensile strength testing instrument and is moved vertically by means of suitable gears in gear housing 91 as described in U. S. Patent 1,324,470. The gears are turned by pulley 92 mounted on the end of shaft 93. Pulley 92 is preferably mechanically driven as by an electric motor connected to the pulley 92 by a suitable belt. Tank 10 is braced by a guide rod 95 which is mounted on the board 75 and which passes through the apertures in brace elements 69.

In the use of the testing device of the invention, in combination with a tensile strength testing instrument, as shown in Fig. 5, asphalt which has been supplied to tank 10 is first heated by means of the strip heaters 63. When the temperature of the asphalt has reached about 450° F., at which temperature it is maintained during the testing operation, displacement chambers 30 and 31 are raised and secured by angular bars 40 and 42 respectively thereby exposing the clamp. One end of the sample of felt to be tested is then inserted between jaw 51 and clamping plate 55 and securely clamped by turning key 58. It will be observed that by means of the key 58 the clamp is externally adjustable. The other end of the felt is secured between the jaws of upper clamp 80.

Displacement chambers 30 and 31 are then depressed in tank 10 and secured in depressed condition by catches 39 and 41 respectively. When the displacement chambers are depressed, the level of the asphalt in the tank rises and sufficient asphalt should be present to cover at least three quarters of the exposed portion of the sample of felt. After an interval of say five minutes, tension is applied to the felt strip by turning pulley 92 which in turn causes rod 90 to retract and exert tension on the sample. As the tension increases, counterweight 85 swings outwardly along arm 87 and hand 77 moves in a clockwise direction on dial 76. When the sample of felt breaks, the ratchet 86 holds counterweight 85 and hand 77 at their last position and the tensile strength of the felt may be determined from a reading on dial 76. To remove the piece of the broken felt from its clamped position in tank 10, the displacement chambers are raised and clamp plate 55 is separated from jaw 51 by turning key 58. The piece of felt may be lifted out with tongs or some similar device.

If it is desired to measure the tensile strength of a sample of felt in a flexed condition, simulating its position in passing over the rolls in the saturating machine, a mandrel unit as shown in Figs. 6 and 7 may be used. A mandrel 100 is mounted between arms 101 which are welded at opposed ends of plate 102. When the mandrel unit is used, the plate 102 is clamped between jaw 51 and clamping bar 55. The sample of felt is then passed around mandrel 100 and both its free ends secured in clamp 80. The testing procedure is carried out as described above.

We claim:

A device for use in measuring the tensile strength of roofing felt while immersed in molten asphalt, which comprises a tank for holding the asphalt, clamping means mounted within the tank for gripping one end of a strip of roofing felt, tensile stress to said roofing felt, vertically movable displacement means disposed in said tank for adjusting the level of the asphalt maintained within the tank, said displacement means being adapted to displace at least one-third of the volume of said tank, whereby upon elevation of said displacement means said clamping means is exposed and heating means for maintaining the asphalt at a selected temperature.

JULES J. PEROT, JR.
GEORGE CAWLEY.

REFERENCES CITED

The following references are of record in the file of this patent:

UNITED STATES PATENTS

| Number | Name | Date |
|---|---|---|
| 940,482 | Scott | Nov. 16, 1909 |
| 1,101,932 | Hooker | June 30, 1914 |
| 1,180,506 | Kirschbraun | Apr. 25, 1916 |
| 2,293,922 | Serinis | Aug. 25, 1942 |

FOREIGN PATENTS

| Number | Country | Date |
|---|---|---|
| 622,323 | Germany | Nov. 26, 1935 |